United States Patent [19]

Sylvan

[11] 3,784,910

[45] Jan. 8, 1974

[54] SEQUENTIAL ADDRESSING NETWORK TESTING SYSTEM

[75] Inventor: Tage Peter Sylvan, Milton, Mass.

[73] Assignee: Teradyne, Inc., Boston, Mass.

[22] Filed: July 13, 1972

[21] Appl. No.: 271,268

[52] U.S. Cl. .............................. 324/73 AT, 324/51

[51] Int. Cl. .............................................. G01r 15/12

[58] Field of Search .................. 324/73 AT, 73 PC, 324/73 R, 51

[56] References Cited

UNITED STATES PATENTS

| | | | |
|---|---|---|---|
| 3,665,299 | 5/1972 | Yarbrough | 324/51 |
| 3,535,633 | 10/1970 | Fallon | 324/73 |

*Primary Examiner*—Rudolph V. Rolinec
*Assistant Examiner*—Rolf Hille
*Attorney*—Melvin R. Jenney et al.

[57] ABSTRACT

The testing apparatus disclosed herein is adapted to test backplane wiring so as to determine if all desired connections exist and whether any undesired connections may be present. Such backplanes typically comprise a multiplicity of terminal points which may be interconnected in arbitrary manner to form a plurality of networks of connected points. The tester employs an addressable switching and memory unit for each terminal point. When addressed, each point is first connected to a first bus and, when the addressing is terminated, is thereafter connected to a second bus, this second connection being maintained under the control of the memory or latch associated with each switching unit. Prior to being addressed, each point is in effect isolated by the switching unit and allowed to float in potential. As the successive points in a given network are addressed, the system tests for continuity between the first and second buses to determine if the desired connections exist. After all terminal points which should be in the selected network have been latched into connection with the second bus, all remaining points are commonly switched into connection with the first bus. Testing for isolation at this time determines whether any undesired connections affecting the selected network are present.

4 Claims, 6 Drawing Figures

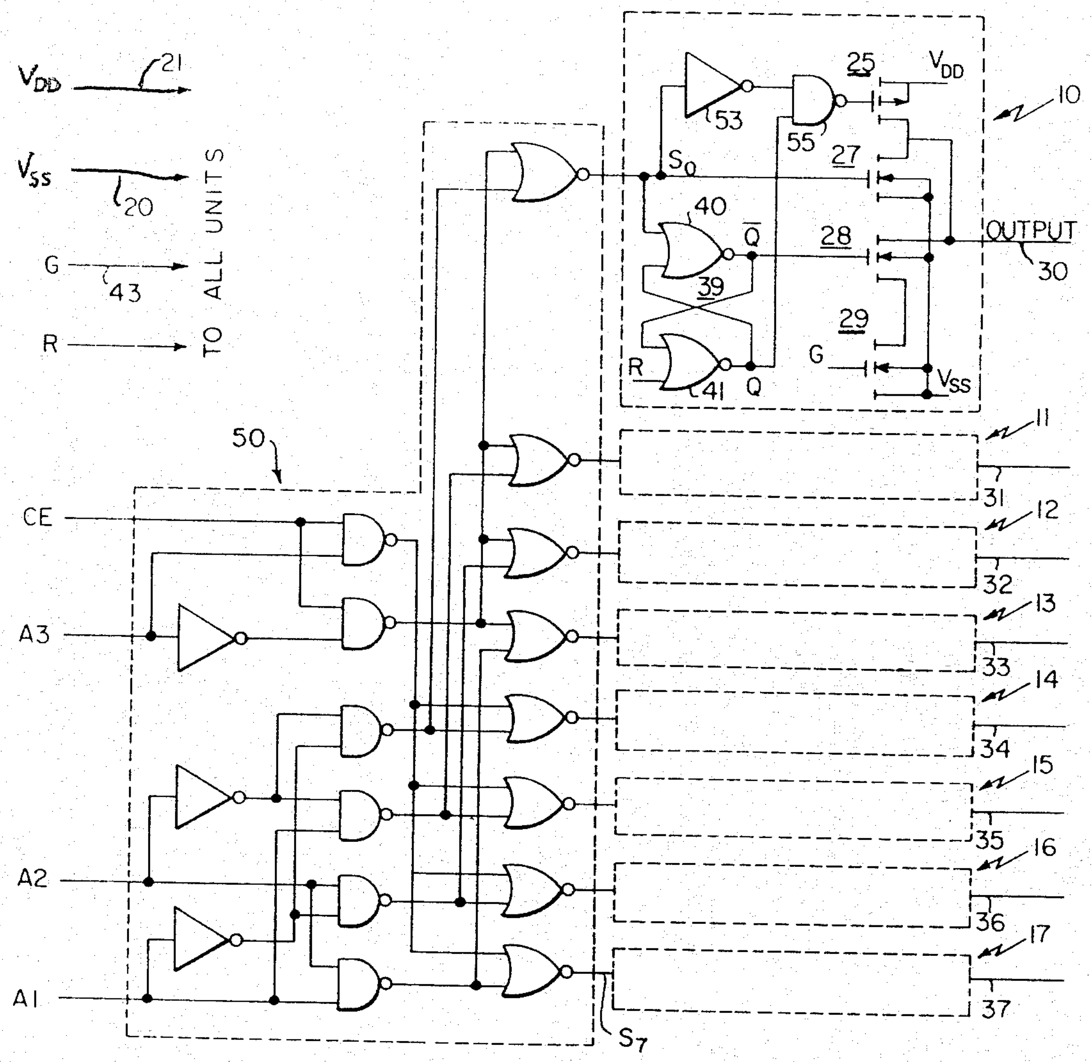

FIG. 1

| CE | $A_3$ | $A_2$ | $A_1$ | $S_0$ | $S_1$ | $S_2$ | $S_3$ | $S_4$ | $S_5$ | $S_6$ | $S_7$ |
|---|---|---|---|---|---|---|---|---|---|---|---|
| L | X | X | X | L | L | L | L | L | L | L | L |
| H | L | L | L | H | L | L | L | L | L | L | L |
| H | L | L | H | L | H | L | L | L | L | L | L |
| H | L | H | L | L | L | H | L | L | L | L | L |
| H | L | H | H | L | L | L | H | L | L | L | L |
| H | H | L | L | L | L | L | L | H | L | L | L |
| H | H | L | H | L | L | L | L | L | H | L | L |
| H | H | H | L | L | L | L | L | L | L | H | L |
| H | H | H | H | L | L | L | L | L | L | L | H |

FIG. 2

SEQUENTIAL TRUTH TABLE

| STEP | FUNCTION | R | $S_0$ | G | Q | $\overline{Q}$ | OUT |
|---|---|---|---|---|---|---|---|
| 1 | RESET, OFF | H | L | L | L | H | OFF |
| 2 | RESET, GATE | H | L | H | L | H | LOW |
| 3 | INITIAL STATE, OFF | L | L | L | L | H | OFF |
| 4 | INITIAL STATE GATE | L | L | H | L | H | LOW |
| 5 | SELECTED STATE | L | H | X | H | L | LOW |
| 6 | SET STATE | L | L | X | H | L | HIGH |
| 7 | RESET AND SELECT | H | H | X | L | L | LOW |

FIG. 3

SEQUENTIAL ADDRESSING NETWORK TESTING SYSTEM

BACKGROUND OF THE INVENTION

This invention relates to a circuit tester and more particularly to a backplane tester adapted to determine whether a multiplicity of terminal points are interconnected in a desired pattern of networks and whether any undesired interconnections exist. This tester employs a plurality of the testing units disclosed in my copending, co-assigned application entitled Tester being filed of even date herewith.

As electronics systems become more sophisticated and complicated, it has become increasingly difficult to determine whether wiring harnesses have been correctly constructed and to locate faults once the existence of a fault has been determined. For example, in some digital computer systems, a large number of circuit boards or cards, each having in the order of 100 terminals, may be plugged side-by-side into a rack panel having a corresponding plurality of edge-connector sockets. Connections between the boards are then established by wiring which interconnects the socket terminals, e.g. soldered or wire-wrapped connections.

As the pattern of interconnection in such a backplane is typically somewhat arbitrary and as the number of points in each network may also be variable, the possibility of a wiring error is relatively high. As is understood, such an error can be either the failure to make a desired connection or the making of an undesired connection. In order to assure that such a backplane is properly wired, it is therefore necessary not only to determine that all desired connections exist but also that there are no undesired connections. To perform such an operation manually is a task requiring an enormous expenditure of time, while also introducing the possibility of human failure in the testing process itself.

In that the testing process is itself iterative in nature and requires the exhaustive evaluation of a large number of connection combinations or permutations, it has been proposed heretofore that such testing be performed under computer control. However, as the number of terminals involved in a given system or backplane increases, the time required even for computer testing becomes significant. Further, in order to permit the computer to test between arbitrarily selected pairs among the multiplicity of terminal points involved, connection typically must be made between each and every pair of terminals in the matrix under test. The requirement of such a large number of interconnections or connections leading back to the computer has introduced the problem that test setup requires a significant amount of time. Further, the statistical possibility of lead breakage or erratic connections becomes significant.

Among the several objects of the present invention may be noted the provision of a method and apparatus for wiring testing which facilitates the exhaustive testing of interconnections in a multiplicity of terminal points; the provision of such a method and apparatus which tests not only to determine if all desired connections exist but also that no undesired connections exist; the provision of such a method and apparatus which provide rapid and reliable testing; the provision of such apparatus in which only a relatively small number of connections or leads are required between a matrix under test and a computer controlling the testing; the provision of such a system which can be readily expanded; and the provision of such apparatus which is relatively simple and inexpensive.

SUMMARY OF THE INVENTION

Briefly, a system in accordance with the present invention is adapted to test interconnections in a matrix of terminal points. The system involves a plurality of test switching units, one for each terminal point, and a decoding system permitting each test switching unit to be selectively addressed by means of coded selection signals. Each of the test switching units operates, when addressed, to connect the respective terminal point to a first bus which is common to all of the test switching units. Each unit also operates, after termination of addressing thereof, to connect the respective terminal point to a second bus which is also common to all of the test switching units. By testing for continuity between the first and second buses during connection of each point in turn to the first bus, the existence of the desired connections may be established. The testing system also includes a plurality of isolation test switching means, one for each terminal point. The isolation test switching means are responsive to a gate signal commonly applied to all of the isolation test switching means for connection to the first bus those terminal points not then connected to the second bus. By testing for isolation between the first bus and the second bus during application of the gate signal, the existence of an undesired connection affecting the selected network can be determined.

BRIEF DESCRIPTION OF THE DRAWINGS

FIG. 1 is a logic diagram of the test switching and latch circuitry of the present invention associated with a group of eight terminal points, together with associated decoding circuitry;

FIG. 2 is a truth table for a decoding matrix incorporated in the circuitry of FIG. 1;

FIG. 3 is a sequential truth table for a test unit employed in the circuitry of FIG. 1;

Corresponding reference characters indicate corresponding parts throughout the several views of the drawing.

DESCRIPTION OF THE PREFERRED EMBODIMENT

Figure 4:
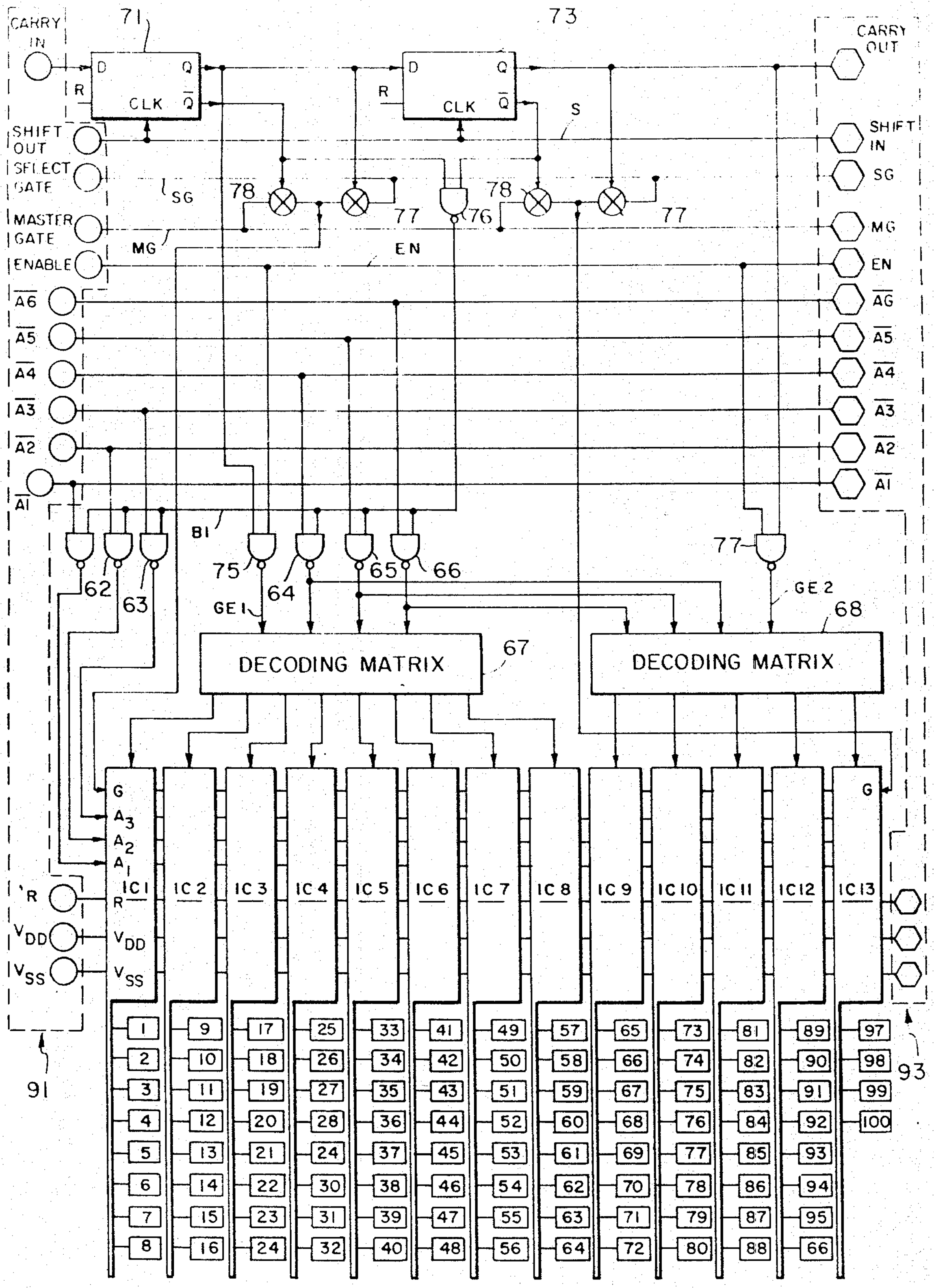
FIG. 4 is a logic diagram showing the interconnection of a group of the units of FIG. 1, together with further addressing and enabling circuitry, forming an array employed on a single test circuit board in a preferred embodiment of the present invention.

The preferred implementation of testing apparatus of the present invention employs integrated circuitry of the complementary-symmetry/metal-oxide-semiconductor type. Such integrated circuits are commonly referred to as COS/MOS or C-MOS devices. As is explained in greater detail hereinafter, the inherent characteristics of such devices strongly complement the design characteristics employed in the preferred embodiment illustrated herein.

In general, it may be noted that conventional logic families of the devices are for the most part made up of individual logic gates each of which comprises both P-channel and N-channel field effect transistors constructed using metal-oxide-semiconductor fabrication techniques. The use of complementary symmetry design allows the individual gates to function in an essentially no-current drain condition in either binary logic state. Further, the MOS fabrication technology results in an insulated gate construction which assures that practically no drive current is required for each gate in either binary state. The solid state division of the RCA Corporation, located in Somerville, New Jersey 08876, manufactures a wide line of standard C-MOS logic circuits ranging from individual gates through so-called medium-scale and large-scale integration and also makes available custom logic circuits made up of arrays of conventional logic elements. A similar line of standard circuits and custom fabrication service using COS/MOS devices is also available from National Semiconductor Company.

As is understood in the art, the output transistors in a typical C-MOS integrated circuit must occupy a substantially larger area on the chip than those transistors which comprise internal logic gates. This is because the output transistors may be expected to drive a plurality of input circuits, e.g. a large fan-out, or substantial lead length or must otherwise provide significant current to a load. Accordingly, output current switching is typically handled somewhat separately or buffered from the internal logic circuitry. Further, in the output switching circuitry employed in the present invention, further considerations regarding linear drive capability and the logic functions necessary are involved and thus the output transistors are indicated individually in FIG. 1 although the circuitry driving these output transistors is defined in conventional NAND/NOR logic symbology.

Referring now to FIG. 1, the circuitry illustrated there is adapted for controlling the state or condition of a group of eight terminal points and is preferably constructed on a single semiconductor chip. As will be apparent hereinafter, the number of leads required for this particular logic system is appropriate for an industry standard package, e.g. a 16 lead dual-in-line package. As noted previously, the entire matrix of terminal points to be tested may comprise in the order of 100,000 points and thus an entire test system in accordance with the present invention will comprise a large number of the custom integrated circuits of FIG. 1. For each of the eight terminal points handled by the FIG. 1 circuitry, there is provided a respective test switching and latch unit, 10–17 respectively. The units 10–17 are identical and only the first, unit 10, is illustrated in detail.

Two of the external leads to the device of FIG. 1 are the ground lead or bus 20 and a positive supply bus 21. These supply potentials are provided to each of the units 10–17, the supply connections at the output circuits being indicated, in industry conventional manner by the designation $V_{DD}$ and $V_{SS}$ to indicate the positive and ground supplies respectively. AS described in greater detail hereinafter, each test unit 10-17 controls the state of a corresponding terminal point in the matrix to be tested, these connections being made through respective device output leads, designated 30–37.

Each test unit 10–17 comprises four FET output transistors, a P-channel transistor 25 and three N-channel transistors 27, 28 and 29. As is explained in greater detail hereinafter, this output arrangement is operable as a three-state switching device permitting the respective output lead 30–37 to be connected to either supply bus or to be isolated. The connections of the several transistors are as follows. The P-channel transistor 25 is connected between the positive supply bus 21 and the respective output lead (30), while the N-channel transistor 27 is connected between the negative supply bus 20 and the output lead. The conduction path through transistor 27 is paralleled or shunted by another path comprising the two transistors 28 and 29 connected in series. In other words, the output lead (30) can be connected to the ground supply bus either through the transistor 27 or through the series pair comprising transistors 28 and 29. As is explained in greater detail hereinafter, this latter, series path is utilized in testing for the existence of undesired connections.

Each unit 10–17 also includes a flip-flop or latch circuit 39 comprising a pair of cross-connected NOR gates 40 and 41. The output signals from flip-flop 39 are designated Q and $\overline{Q}$ in conventional fashion. One of the inputs to the device of FIG. 1 is a reset signal which is provided commonly to all of the units 10–17 through a device input lead 43. This signal, designated R, is applied to the flip-flop 39 so as to place it in a "reset" state in which the output signal Q is low.

Three of the inputs to the device of FIG. 1 are for coded address signals, designated A1-A3, while a fourth input is for a chip enable signal, designated CE. The chip enable and address signals are applied to an essentially conventional decoder network 50. The address signals A1-A3 are decoded in conventional one-of-eight manner to provide a respective select signal for each of the test units 10–17, the respective select signals being designated $S_0$-$S_7$. An individual test unit 10–17 may be considered to be enabled or addressed when the respective select signal is high. The generation of a high or affirmative select signal for any unit is also conditioned upon the presence of a high at the chip enable input. The truth table for this decoder network is given in FIG. 2 in which L indicates a low input or output state, H indicates a high input or output state and X indicates an indifferent or don't care condition.

Within each unit 10–17, the respective select signal is applied directly to the gate of the N-channel transistor 27 and also to the set input to the flip-flop 39. The respective select signal is also applied, through an inverter 53, to a NAND gate 55 where it is combined with the Z output signal from the flip-flop 39. The output signal from the NAND gate 55 is applied to the gate of the P-channel transistor 25. As the transistor 25 is of the P-channel type, its channel circuit is rendered conductive by the application of a low signal as contrasted with the N-channel transistors 27–29 which are rendered conductive by a high signal.

Conduction through the N-channel transistor 28 is controlled by the $\overline{Q}$ output signal from the flip-flop 39 while conduction through the N-channel transistor 29 is controlled by a gate signal, designated G, which constitutes one of the inputs to the system of FIG. 1 and which is applied commonly to all of the test units 10–17. As the control signal G is applied directly to the gate terminal of each transistor 29 without the interposition of intervening logic gates of the digital or switching type, it can be seen that conduction through transistor 29 can be controlled in a gradual or linear manner as distinct from the abrupt step change characteristic of digital control signals.

Consistent with the foregoing, the internal operation of each of the units 10–17 is as follows, reference being had to the sequential truth table of FIG. 3. When the reset signal goes high, the flip-flop 39 is reset so that its output signal Q goes low and the output signal $\overline{Q}$ goes high. Assuming that the respective select signal is not high, the N-channel transistor 27 will be turned off and the P-channel transistor 25 will be prevented from being turned on by the low state of the Q signal. While the N-channel transistor 28 is turned on by the $\overline{Q}$ signal, no actual conduction will take place through this path so long as the N-channel transistor 29 is not turned on. Since the output lead 30 is thus connected to neither of the ground bus nor the positive supply bus, it is in effect isolated or free to float in potential between the two supply levels. This state is indicated in the truth table of FIG. 3 by the designation "OFF."

When the latch 39 is in a reset condition, the application of the gate signal will establish a conducting path by turning on transistor 29 thereby pulling the output lead 30 down to ground potential as indicated in the second step of the sequential truth table of FIG. 3. As indicated in steps 3 and 4 of the truth table, the gate signal G can control the state of the output lead 30 between its isolated and low states even after the reset signal is terminated, as long as the flip-flop 39 remains in its reset state.

When, in response to the appropriate combination of address and chip enable signals, the respective select signal is applied to a given test unit 10–17, its flip-flop 39 is placed in its "set" state and the respective N-channel transistor 27 is turned on directly by the select signal. While the N-channel transistor 28 is directly turned off by the $\overline{Q}$ output signal from the flip-flop 39, the Q output signal from the flip-flop is prevented from immediately turning on the P-channel transistor 25 by the application of the inverted select signal as one of the inputs to the NAND gate 55. Thus, during the actual application of the respective select signal, the respective output lead 30 is connected to the ground bus through the transistor 27 rather than to the positive bus through the P-channel transistor 25. This state is represented on the fourth line of the FIG. 3 truth table. At the termination of the select signal, the situation reverses. The return of the select signal to the low level turns off the transistor 27 while the resultant high level signal provided by the inverter 53 enables the Q output signal from the flip-flop 39, operating through the NAND gate 55, to turn on the P-channel transistor 25. This is illustrated in step 6 of the sequential truth table of FIG. 3. If the reset and select signals are both applied simultaneously, a condition not normally encountered, the output lead 30 is pulled to its low state regardless of the condition of the gate signal.

As noted previously, a backplane or other matrix of terminal points to be tested may easily comprise in the order of 100,000 points. Accordingly, a complete backplane test system in accordance with the present invention will typically include a large number of the devices of FIG. 1 together with further addressing/selection circuitry to permit individual such devices to be enabled. While particular apparatus for addressing and controlling such an array of test units is described in greater detail hereinafter, it should be understood that many other such systems could be straightforwardly derived to employ these testing units to advantage. It is thus appropriate, at this point, to describe how the inherent operation of these individual test switching and latch units greatly facilitates the generalized testing of network matrices.

As also mentioned previously, the current drain of the internal logic gates employed in the illustrated embodiment when using C-MOS construction is so low that a connection or continuity established between the positive and ground supply buses through the device output transistors is readily detectable by virtue of the increased current drain on the supply irrespective of the states of the various internal gates and latches. Accordingly, the existence of a network or wired connections linking a plurality of terminal points may be determined or tested by sequentially addressing the test units corresponding to those terminal points in sequence and sensing for the presence of such an output circuit connection between the supply buses as the sequential testing progresses. If the network exists, such an output circuit connected will be sensed as each terminal point, subsequent to the first, is addressed. This comes about as follows. During the interval each test unit is being addressed, the respective terminal point is connected to the ground supply bus through the respective N-channel transistor 27. As the selection signal also causes the respective flip-flop 39 to be set, the subsequent termination of the select signal will cause the terminal point to then be connected to the positive supply bus through the P-channel transistor 25.

When the first point in a given network is addressed, no output circuit connection between the supply buses will be produced because all of the other terminal points in the matrix are in their initial or isolated state. However, when the second and subsequent points making up the desired network are addressed, such a connection will exist if the actual network conforms to the desired network. The connecting path, starting from the ground bus, is through the transistor 27 in the test unit then being addressed to the corresponding terminal point in the matrix; through the network being tested to the terminal points previously addressed; and through the P-channel transistors (25) in the previously addressed test units to the positive supply bus. As noted previously, the P-channel transistors in the previously addressed test units are maintained in conduction by the respective flip-flop or latch circuits which act as memory elements associated with each terminal point.

During the testing of a particular network, each terminal point comprising the network is latched in turn into connection with the positive bus. Thus, after the last such terminal point has been addressed, all of the terminal points belonging in the network will be latched into conduction with the positive bus. To then test for isolation of the selected network from all other terminal points in the matrix, i.e., to determine that there are no improper connections existing which affect that network, the gate signal G is then applied while the supply current is monitored to determine the existence of an output circuit connection between the supply buses. The effect of applying the common gate signal is to simultaneously connect all remaining terminal points in the matrix to the ground supply bus by turning on the respective transistors 29. As the internal latch circuit 39 incorporated into each test unit 10-17 operates, when set, to turn off the transistor 28 in series with each transistor 29, only those units which were not previously addressed will be actuated by the common gate signal to actually establish a conductive path between the respective output lead and the ground bus. It can thus be seen that the internal latching circuit or memory element associated with each test unit facilitates this operation also. If no improper connections affecting the network under test are present, the application of the gate signal will not produce the rise in supply current drain which is taken as indicative of an output circuit connection between the supply buses. In other words, the network under test may be accepted as being isolated from the other terminal points in the matrix.

As was described previously, the direct access provided to the gate terminals of the transistors 29 permits the use of a ramp voltage to perform this test. This is advantageous because, during this test of isolation, a large number of the transistors 39 are turned on at once. While an individual field-effect transistor is inherently current limiting as noted hereinbefore, a conductive path extending through the paralleled channels of a plurality of such transistors could so load the current supply that a precipitous drop in supply bus voltage might occur which could destroy the data latched into the various flip-flops 39. By using a ramp voltage to gate on the transistors 29, an increased current drain indicative of an output circuit connection can be sensed at a relatively low current level and then the application of the common gate signal can be terminated to prevent such an overload.

As mentioned previously, conventional edge terminal circuit board constructions may encompass in the order of 100 terminals. In accordance with another aspect of the present invention, a number of the integrated circuits of FIG. 1, together with further decoding and addressing circuitry, are grouped on a test circuit board having a number of terminals corresponding to the number present on the circuit boards which will actually be used in the system being tested. The logic circuitry provided on each such test circuit board in a preferred embodiment is illustrated in FIG. 4. In FIG. 4, the individual custom integrated circuits of FIG. 1 are indicated at IC1-IC13. The ground and positive supply buses are provided to each board and, on the board, are applied directly to the integrated circuits IC1-IC13. The coded address signals A1-A3 referred to previously are provided to the circuit board in inverted form, designated $\overline{A1}$-$\overline{A3}$ respectively, and are coupled in parallel to the integrated circuits IC1-IC13 through NAND gates 61–63. A board-inhibit signal, designated BI, is also applied as a second input to each of these gates so that the application of the address signals to the ICs is conditioned upon the BI signal being in its high state.

In addition to the previously mentioned coded address signals, there are also applied to each test circuit board three further coded address signals, designated $\overline{A4}$-$\overline{A6}$. These latter address signals are applied, through respective NAND gates 64–66, to a pair of decoding matrices 67 and 68. The board-inhibit signal BI is applied as a second input to each of the gates 64–66. Each decoding matrix operates to perform a one-of-eight dcoding operation on the coded address signals applied, i.e., in a manner similar to the one-of-eight decoding provided within each custom integrated circuit IC1-IC13. The generation of an output signal at any one of the eight output leads for each matrix is again conditioned upon the application of a respective fourth input signal, which signal functions as a group enable signal. The group enable signal to the decoding matrix 67 is designated GE1 while the group enable signal applied to matrix 68 is designated GE2. The respective output signals provided by each of the decoding matrices 67 and 68 is applied to a respective one of the custom integrated circuits IC1-IC13 as its respective chip enable signal CE. In the embodiment illustrated, the test board is set up to accommodate 100 terminals rather than a number of terminals which is equal to an even binary number. The decoding matrices 67 and 68 are standard IC chips providing eight decoded output signals and thus three of the output signals from the second decoding matrix are unused. Likewise, four of the output leads from the last custom integrated circuit IC13 are also unused.

In accordance with a still further aspect of the invention, the individual test circuit boards of FIG. 4 are arranged so that a plurality of such boards can be connected together in daisy chain fashion. In FIG. 4, male and female connectors are indicated at 91 and 93, respectively, for coupling signals and supply voltages into and out of each test board.

Figure 5:
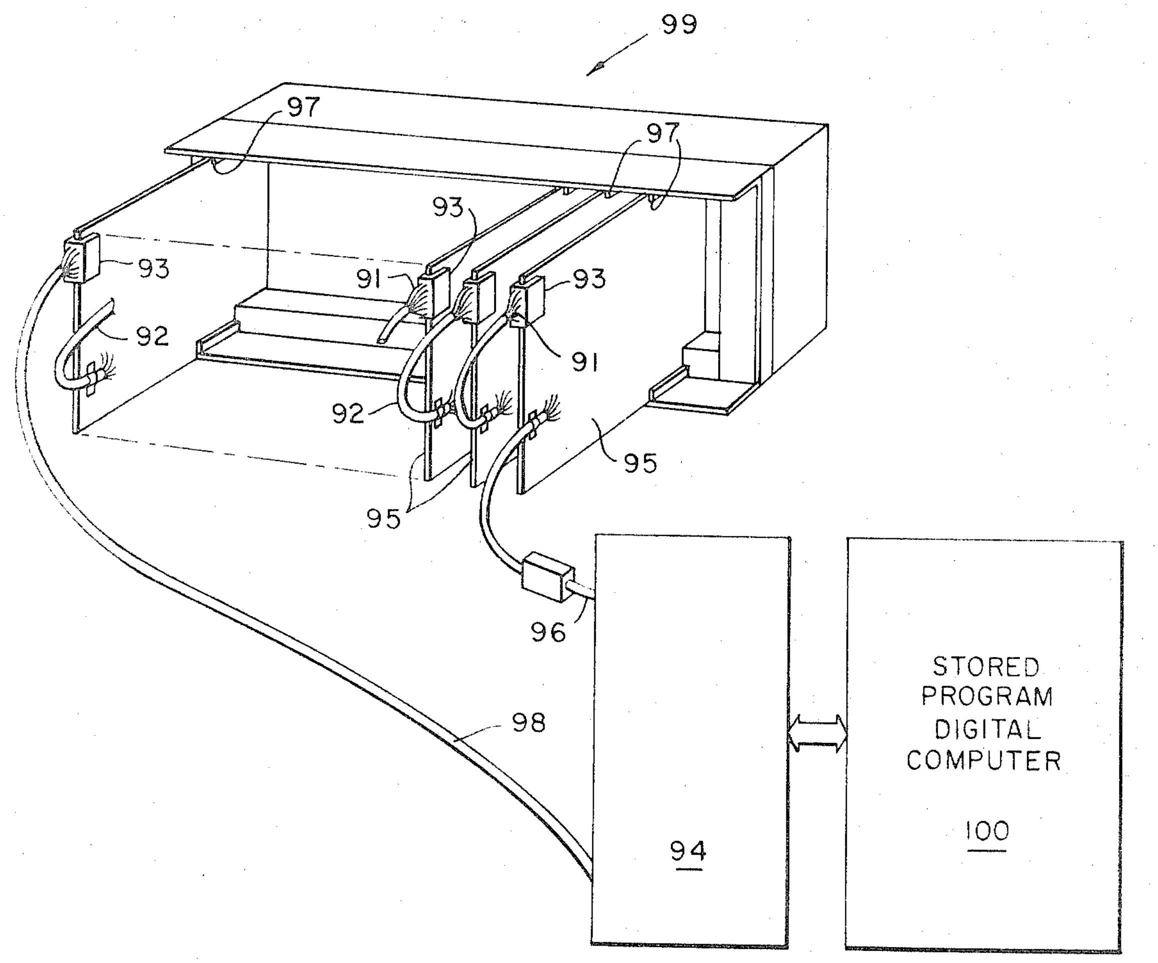
FIG. 5 is a perspective drawing illustrating the physical arrangement and interconnection of a plurality of circuit boards of the type shown in FIG. 4 in association with a backplane which is to be tested.

As illustrated in FIG. 5, the individual test boards, designated 95, are adapted to be plugged into respective sockets 97 in a backplane 99 in place of the circuit boards which will occupy those sockets in the ultimate use of the backplane being tested. The male connectors 91 on each of the boards are mounted on flexible cables 92 and are, except for the last one in the sequence, coupled to the female connectors 93 on the adjacent board. The end connectors are coupled back to a test control system 94 through longer cables 96 and 98. The test control system which provides the signals which control the operation of the test boards and which responds to sensed conditions of continuity and isolation is described in greater detail with reference to FIG. 6. The test control system operates in conjunction with a stored program digital computer, indicated generally at 100, which loads test parameters and terminal address and which reads out test results, i.e., data representing the existence of network continuity and isolation.

The terminals in each connector 91 and 93 are designated in FIG. 4 by the signal or voltage which each carries. As may be seen, most of the corresponding input and output terminals are connected directly so that the same signals are effectively applied to all boards in parallel. The main exception is for those terminals carrying the shift signal which relate to the board selection system employed in the preferred embodiment illustrated.

In order to provide for the addressing of a particular test circuit board in a series of such boards, the illustrated embodiment employs a serial addressing scheme using a shift register arrangement in which successive portions of the shift register are on successive boards in the series of boards. In the embodiment illustrated, each board comprises two groups of the integrated circuits of FIG. 1, corresponding to the respective decoder matrices 67 and 68, and thus each circuit board comprises two stages of the shift register. Each stage comprises a D-type flip-flop, 71 and 73 repectively. A shift signal, designated S, controls the clocking of the D-type flip-flops and is applied in common to all the shift register flip-flops in all the boards. Each D-type flip-flop has a data input D and complementary outputs, designated Q and $\overline{Q}$ in conventional fashion. When the shift signal S is applied to the clock input of each flip-flop, its Q output terminal assumes the state of the respective input signal at the moment of the positive-going transition of the shift signal. The reset signal R is also applied commonly to all of the D-type flip-flops 71-73 so that these devices are also set to an initial state in which the Q output signal is low at the same time the latches in the test units are reset.

THe Q output signal from each D-type flip-flop 71 and 73 is combined with a common enable signal, designated EN, in a respective NAND gate 75 and 77 to obtain the respective group enable signals GE1 and GE2. As noted previously, a selected one of the chips IC1-IC13 will be enabled only when the corresponding group enable signal GE1 or GE2 is provided. The $\overline{Q}$ signals from both D-type flip-flops on a single board are combined in a NAND gate 76 to generate the board inhibit signal BI which blocks all of the coded address signals from affecting any further part of the board circuitry if neither group on the board is selected.

In the preferred embodiment illustrated, all of the test circuit boards are identical. It can thus be seen that by initially setting the first D-type flip-flop in the string, i.e. by introducing a binary bit or "high" signal into the first D-type flip-flop and thereafter holding its input at a low level while applying a sequence of shift pulses, the initially introduces bit will be stepped down the shift register, passing from one D-type flip-flop to the next and also from one circuit board to the next. Accordingly, by generating a string of shift pulses of appropriate number, only the D-type flip-flop corresponding to a selected group will be enabled. In the embodiment illustrated, a single group comprises the custom integrated circuits, e.g. IC1-IC8, corresponding to a single one of the group decoding matrices 67, 68 and thus up to 64 terminal points may be encompassed in a group in this embodiment.

As noted previously, the direct access provided to the gate terminal of each N-channel transistor 29 permits its conduction to be varied gradually or linearly. In the preferred embodiment illustrated, conduction through the transistor 29 may be controlled by either a selective gate signal, designated SG, or a master gate signal, designated MG, both of these signals being provided to all of the boards in parallel. Within each group, the gate lead common to all of the custom integrated circuits, e.g. IC1-IC8, receives either the select gate signal SG through a linear transmission gate 77 or the master gate signal MG through a transmission gate 78. The transmission gate 77 is controlled by the Q output signal of the respective D-type flip-flop while the transmission gate 78 is controlled by the complementary output signal $\overline{Q}$. As is understood in the art, the transmission gates 77 and 78 are essentially bilateral switching devices functioning in a manner similar to a relay and are adapted to couple analog signals from input to output under the control of a binary gating signal. These devices present either an open circuit or a closed circuit to the analog signal, depending on the state of the binary control signal.

As will be understood by those skilled in the art from the foregoing, the combination of serial and parallel addressing provided in the embodiment illustrated, permits the addressing or selection of an individual test unit within the entire multiplicity of test units, there being one test unit for each terminal point in the matrix to be tested. Summarizing, the serial addressing system which employs the shift register made up of D-type flip-flops (71,73) allows a particular group of test units to be enabled; the parallel coded address signals $\overline{A4}$-$\overline{A6}$ select which one of the custom integrated circuits in the chosen group is enabled; and the parallel coded address signals $\overline{A1}$-$\overline{A3}$ select which one of the test units in the selected integrated circuit is in fact addressed. The detailed response of each testing unit to be selected or addressed has been described hereinbefore.

As indicated previously, the overall testing apparatus illustrated is adapted to operate under the control of a stored program digital computer from which it obtains test parameters and network terminal definitions and to which it provides indications of continuity or isolation for each terminal point under test. The interfacing and sensing apparatus which serves to couple the array of test circuit boards with the computer is illustrated in diagrammatic form in FIG. 6. The coded parallel address signals are loaded into a suitable storage register 101 and applied to the parallel address signal line A1-A6. Similarly, a coded number representing the serial address is loaded into a register 103 for storage.

As described previously, serial addressing is accomplished by shifting a single enabling bit along the shift register distributed among the several test circuit boards in the sequence. The repetitive shift signal is generated by a gated oscillator 113. A counter 115 is driven by the shift signal after circling the "daisy chain" loop and is thereby advanced to represent the advance of the enabling bit along the shift register. When the value in the counter 115 reaches that entered in the serial address register, as detected by a comparator 117, the gated oscillator is stopped so that the desired group of test elements is enabled. As indicated in FIG. 4, the shift pulses are sent around the loop in the opposite direction from the direction of shifting so that race conditions are avoided. To clear the shift register distributed among the test boards, the sequential address register 103 is set to zero. The oscillator 113 is thus enabled and runs until a previously entered bit is worked through the shift register and sets a flip-flop 121. The output signal from flip-flop 121, combined in an AND gate 123 with an "ALL ZERO" signal obtained from the register 103, serves to set a flip-flop 125 which provides the initial bit on the CARRY line so that the next serial address can be entered. Flip-flop 125 is then reset by the first SHIFT pulse so that only one bit is entered into the shift register.

As each terminal point is addressed and enabled, the system tests for continuity or connection by sensing for significant current drain between the positive supply bus and the ground supply bus. In the embodiment illustrated, current drain is sensed on the ground or negative side by a current-to-voltage converter 105 although it should be understood that this sensing could also be accomplished on the positive side. As noted previously, the complementary symmetry, MOS/FET logic circuitry, draws insignificant current in any static state and thus a connection between two terminal points which are switched, through the various output transistors 25, 27, 28 and 29 to opposite supply buses will be readily detectable in the current drain drawn by the boards taken as a group. However, if it is desired to use different logic families, separate sensing and supply bus systems may be used. In order to allow the testing apparatus to operate flexibly, the level of current which is accepted as representing a connection may be preset. The preselected value, represented by a binary coded number, is entered into a threshold value register 106 by the computer. As is conventional, the entry of data into the various registers from the common computer input/output bus 107 is controlled by respective WRITE pulses. This value is then converted by a digital-to-analog converter 109 into a voltage signal which is compared as indicate at 111 with the current drain analog. If the threshold is exceeded, a signal is generated which may be read by the computer and interpreted in accordance with the test being conducted.

Figure 6:
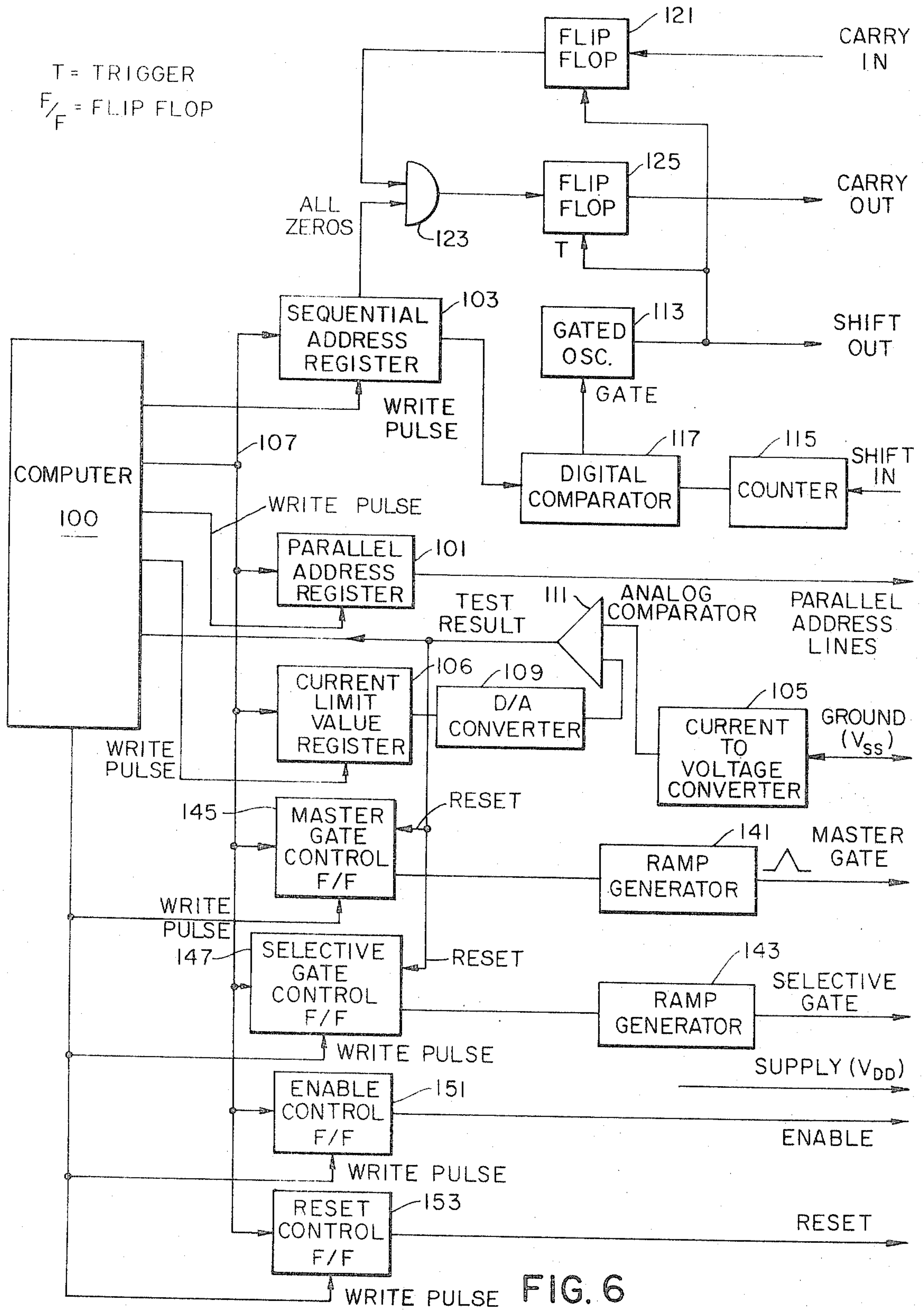
FIG. 6 is a block diagram of control circuitry for addressing and responding to the test operations provided by the test circuit boards.

As mentioned previously, it is desired to test to determine not only that all desired connections exist, i.e., continuity, but also to assure that there are no undesired connections. After all the terminal points defining a given individual network have been addressed, isolation of that network from all other terminal points is determined by gating the remaining terminal points to the ground supply bus through the use of the common gate signal. As noted previously, the common gate signal affects only those test units in which the flip-flop or latch circuit 39 has not been set. As a large number of transistors (29) are turned on simultaneously by the common gate signal G and since these transistors comprise parallel circuits, the inherent current-limiting factor discussed previously with regard to the continuity checks is not effective here. Accordingly, in accordance with another aspect of the invention, the transistors 29 are turned on gradually by a ramp signal while the supply current is monitored. With reference to FIG. 6, a slowly rising control voltage is provided by means of either a ramp generator 141 or a ramp generator 143, the start of the ramp in either case being initiated under computer control. If, during the ramp, the current drawn from the supply buses exceeds the value corresponding to that held in the threshold value register 106, the comparator 111, in addition to providing to the computer a trip indication as noted previously, resets the respective ramp generator control flip-flop 145 or 147. If, in fact, the network under test is not connected to any of the remaining terminal points, i.e., if there is in fact isolation of that network from the other circuits in the matrix, the ramp signal is allowed to go to full amplitude and the transistors 29 are fully turned on. The ramp voltage generated by the circuit 141 is applied either to the master gate bus while that provided by the generator 143 is applied to the group gate bus.

When the various addresses and values are set, the computer also sets flip-flops 151 and 153 which, respectively, provide the enable and reset control signals. As will be understood from the preceding description, these signals are applied in combinations and/or sequences under the control of the computer program to produce the various test operations described.

While in the earlier general explanation of the overall testing operation and the advantages of the testing units of the type illustrated in FIG. 1, it was assumed that the gate signal G applied to the gate terminals of the transistors 29 was applied commonly to all the transistors 29 in the entire system, control apparatus was subsequently described which permitted the appli-cation of the ramp voltage to be limited to a selected group of test units under program control. As described, the particular program instruction being executed can determine whether the ramp voltage generated during isolation testing is supplied either to the master gate lead MG or to the select gate lead SG. If the ramp voltage is applied only to the select gate lead, the ramp voltage will be applied only to those test units in that group of units which has been previously enabled by the serial addressing. For example, if the serial address has caused the flip-flop 71 in FIG. 4 to be left in a set state, the select gate lead will be coupled to the gate input terminals of the eight integrated circuit chips IC1-IC8 within that group. Correspondingly, since the transmission gates 78 corresponding to each of the remaining D-type flip-flops constituting the shift register will be turned off, none of the other integrated circuit test systems of the type illustrated in FIG. 1 will receive the ramp voltage. This ability to connect unlatched terminal points to the ground bus, group by group, facilitates the isolation of an improper connection affecting the network under test, i.e. a short, by permitting it to be located within a group.

Since the testing apparatus of the present invention permits the controlling computer to perform continuity tests between any selected pair of terminals within the entire matrix as well as to test for isolation of any terminal, or group of terminals, from the rest of the terminal points in the entire matrix, it can be seen that, through the use of adaptive programming, a search out program can be initiated upon the discovery of a fault and, through testing and exhaustion of the various possibilites, the particular improper cross-coupling can be isolated. The length of the program required to perform such a test is considerably shortened by the ability of the apparatus to permit testing for isolation of the network under test from selected groups of terminal points so that the fault can be located in a general way, prior to point-by-point testing for the location of the fault.

Given the ability of the present apparatus to test, in a greatly facilitated manner, for the existence and location of an unknown connection as well as its ability to determine the existence of a connection between any selected pair of points within the matrix and to likewise determine the isolation of any group of points constituting a network from the rest of the matrix, it can further be understood by those skilled in the programming arts that an adaptive or learning program can be written which will, without prior knowledge of any of the connections in a matrix, exhaustively test the matrix to determine all the connections that exist. The results of this determination can be employed as a wiring list empirically derived. While such an exploratory analysis program will of course take substantially more time than a test program which proceeds on the basis of merely assuring that desired, predefined connections exist, the facilitated testing operation provided by the apparatus of the present invention permits such an empirical learning procedure to be accomplished in a relatively short period, i.e. a matter of minutes as compared with the time which might be required to even center the information defining the interconnection of a matrix into a computer memory. Thus, given one properly wired matrix of terminal points, the testing apparatus of the present invention operating under computer control can analyze that matrix and store the data defining the various networks linking the terminal points in the matrix. Subsequently, other matrices can be tested from that stored information in relatively short periods of time to determine whether their wiring conforms to that of the original. Such a procedure may be highly desirable in the case of relatively small production runs where the cost of manually entering or defining the test information cannot be written off over a long production run. Similar benefits obtain where the pattern of networks linking the matrix of terminal points may be frequently changed.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for testing matrix wiring which interconnects a plurality of sockets each having a substantial number of connection terminal points, said apparatus comprising:

a plurality of circuit boards each of which is adapted to mate with a respective one of said sockets;

on each board, a respective continuity test switching means for each terminal, each test continuity switching means having an initial state in which the respective terminal is isolated, a second state in which the respective terminal is connected to a first bus and a third state in which the respective terminal is connected to a second bus;

for each test switching means, a latch circuit which is set by a respective select signal and which operates, during application of the select signal, to place the respective switching means in its second state and which operates following termination of the respective select signal to hold said switching means in its third state;

for each terminal, a respective isolation test switch means, responsive to a gate signal applied to all isolation test switch means simultaneously, for connecting the respective terminal to said first bus on the condition that the respective latch circuit is not set;

means for coupling addressing signals to all of said boards;

means responsive to a first portion of said addressing signals for selecting which of said boards will be responsive to the remainder of said addressing signals; and, on each board, decoding means responsive to the remainder of said addressing signals for generating a select signal corresponding to the address for selecting which of the test switching means on that board is to be operated, whereby each network in the wiring matrix can be tested by successively addressing the points comprising the desired network to determine the existence of the desired connection pattern and by then applying the gate signal to determine isolation of that network from all other terminal points.

2. Apparatus as set forth in claim 1 wherein each continuity test switching means includes a MOS field-effect transistor of one conductivity type connecting the respective terminal point to said first bus and a MOS field-effect transistor of the opposite conductivity type connecting the respective terminal point to said second type and wherein said isolation test switching means comprises a pair of MOS field-effect transistors of said one conductivity type connected in series to form a conduction path between the respective point and said first bus in parallel with the first said field-effect transistor, one of said pair being controlled by said latch to open said conduction path when said latch is set, the conductivity of the other being proportionally controlled by said gate signal.

3. Apparatus for testing backplane wiring which interconnects a plurality of sockets each having a substantial number of connection terminal points, said apparatus comprising:

a plurality of circuit boards each of which is adapted to mate with a respective one of said sockets;

on each board, a respective test switching means for each terminal, each test switching means having an initial state in which the respective terminal is isolated, a second state in which the respective terminal is connected to a first bus and a third state in which the respective terminal is connected to a second bus;

for each test switching means, a latch circuit which is set by a respective select signal and which operates, during application of the select signal, to place the respective switching means in its second state and which operates following termination of the respective select signal to hold said switching means in its third state, each of said latch means being resettable, by means of a reset signal applied commonly to all of said latch means, to return said test switching means to said initial state;

means for coupling addressing signals to all of said boards;

on each board, decoding means responsive to said addressing signals for generating a corresponding select signal for selecting which of the test switching means is to be enabled, whereby, following resetting, continuity in a network can be tested by sequentially selecting those network test switching means corresponding to the points properly belonging to the network while testing for continuity between said first bus and said second bus.

4. Apparatus for testing backplane wiring which interconnects a plurality of sockets each having a substantial number of connection terminal points, said apparatus comprising:

a series of circuit boards each of which is adapted to mate with a respective one of said sockets;

on each board, a respective continuity test switching means for each terminal, each continuity test switching means having an initial state in which the respective terminal is isolated, a second state in which the respective terminal is connected to a first bus and a third state in which the respective terminal is connected to a second bus;

for each test switching means, a latch circuit which is set by a respective select signal and which operates, during application of the select signal, to place the respective switching means in its second state and which operates following termination of the respective select signal to hold said switching means in its third state, each of said latch circuits being resettable, by means of a reset signal applied commonly to all of said latch means, to return the respective continuity test switching means to said initial state;

for each terminal, a respective isolation test switch means, responsive to a gate signal applied to all isolation test switch means simultaneously, for connecting the respective terminal to said first bus on the condition that the respective latch circuit is not set;

shift register addressing means having successive stages distributed among said boards for selectively enabling a preselected group of said test switching means on one of said boards;

connection means for coupling electrical levels from each board to the next in the series, said electrical levels including said first bus and said second bus, said gate signal and said reset signal, signals linking successive stages of said shift register addressing means, and further parallel addressing signals applied commonly to all said boards;

on each board, decoding means responsive to said parallel addressing signals for selecting which of the test switching means in a group on that board can be selected, whereby continuity in a desired network can be tested by sequentially addressing the switching units corresponding to he points properly in the network while testing for continuity between said buses and isolation of said network can be tested by applying said gate signal commonly to the isolation test switching means while testing for isolation between said supply buses.

* * * * *